3,234,004
STABILIZED LIQUID FERTILIZER COMPOSITIONS
Homer A. Smith, Berkeley Heights, and Edgar W. Sawyer, Jr., Metuchen, N.J., assignors to Minerals & Chemicals Philipp Corporation, Menlo Park, N.J., a corporation of Maryland
No Drawing. Filed Mar. 28, 1961, Ser. No. 98,774
8 Claims. (Cl. 71—28)

This application is a continuation-in-part of our copending U.S. patent application, Serial No. 668,883, filed July 1, 1957, and now abandoned.

This invention relates generally to liquid fertilizer compositions containing material which tends to crystallize or salt out during production and/or storage. The invention relates especially to concentrated aqueous solutions of fertilizer salts which tend to salt out in appreciable quantity during cooling.

In recent years the use of liquid plant food compositions to assist plant growth has become widespread. Such fertilizers usually contain one or more of the primary active plant food components; that is, nitrogen (N), phosphorus pentoxide ($P_2O_5$), and potash ($K_2O$). Liquid fertilizers are usually supplied to the trade as water concentrates which are at times subsequently diluted by the user. The concentration of available active plant food components therein is commonly expressed as the $N-P_2O_5-K_2O$ weight ratio.

Liquid plant food concentrates are normally prepared by one of two general methods. In the first, the correct proportions of such solid plant food materials as urea, ammonium phosphate, phosphoric acid, ammonium nitrate, potassium chloride, etc., are dissolved in water to give the desired analysis product; heat and agitation are usually employed to aid in the dissolution of the solids. The second method, which is meeting more widespread use today, is based on the use of liquid or anhydrous ammonia as the primary nitrogen source. Ammonia based liquid fertilizers have met widespread acceptance by the trade because of relatively low material costs, low losses due to leaching because of the ready adsorption of ammonia by the soil, and further, because both nitrate and ammonia nitrogen are made available to the plant by the transformation of a portion of the ammonia by the soil to a nitrate salt. High nitrogen analysis solutions are obtained by dissolving urea and/or ammonium nitrate in ammonia solutions. Mixed fertilizer solutions may also be formulated with ammonia. In this case, phosphoric acid, frequently the relatively pure electric furnace grade, is employed as the source of $P_2O_5$. Supplemental nitrogen may be supplied by the addition of water-soluble ammonium salts or urea; muriate of potash may be added when desired in the formulations.

In formulating liquid fertilizers it is highly desirable to produce compositions as high in nutrient content as possible to avoid the expense of storing, handling or shipping large quantities of water. In producing liquid fertilizer concentrates intended to be stored or shipped, it has been considered necessary to provide clear solutions which resisted "salting out" upon cooling so as to insure against higher analysis of nutrient at the bottom of the composition and to obviate the necessity for redissolving hard caked matter in shipping and storage tanks. Further, it has been considered necessary to spray liquid fertilizers under conditions of temperature at which the fertilizer is clear and free from coarse crystallized solid particles which would clog spray nozzles and necessitate costly shutdown of spraying equipment.

With these requirements in view, there are several practical limitations to the use of very high concentrations of primary plant food salts in liquid fertilizer concentrates. These limitations arise as a result of the fact that the solubility of practically all primary plant food salts in water or ammoniacal water decreases with decrease in temperature. For example, the water solubility of ammonium nitrate, urea, ammonium phosphate and potassium nitrate decreases very sharply with decrease in temperature, as indicated by the sharp positive slope of solubility curves of these materials. Thus, upon cooling 100 lbs. of a saturated ammonium nitrate solution (65% solution) from 68° F. to 50° F., 13 lbs. of material will salt out; 24 lbs. of ammonium nitrate will salt out upon cooling a saturated solution from 68° F. to 32° F. About 14 lbs. of potassium nitrate salts out of 100 lbs. of a saturated potassium nitrate solution when it is cooled from 68° F. to 32° F. It is apparent that the quantities of ammonium nitrate and potassium nitrate which can salt out of solution upon cooling may represent a significant proportion of the total composition. Similarly, nitrogen enriched solutions, such as a 41% total N composition containing 19% ammonia, about 72%–74% ammonium nitrate and the balance water should be stored and shipped at temperatures above about 61° F. to 64° F., at which temperatures incipient salting occurs and increases rapidly upon further decrease in temperature. The problem is somewhat less serious with potassium chloride, whose solubility at room temperature does not differ appreciably from its solubility at 30° F. or 40° F. For example, when about 100 lbs. of a saturated KCl solution is cooled from about 68° F to 50° F. only about 2 lbs. of KCl will salt out; 5 lbs. will salt out upon cooling the solution from 68° F. to 32° F.

When clear concentrated solutions of the aforementioned primary plant food salts (or mixtures of such salts) are cooled during shipping or storage, cooling is relatively slow. This condition generally favors the salting out of fertilizer salts from a saturated aqueous phase as large crystals which settle to the bottom of the mother liquid to form a dense, caked crystalline deposit. If the mother liquid is decanted or otherwise separated from the sediment without redissolving the sediment, the liquid will be considerably poorer in nutrient value than when freshly formulated. Unless the storage tank or railway car is equipped with heating coils and usually agitators, which is infrequently the case, a solution of proper analysis cannot be withdrawn. The problem is especially serious with potassium nitrate and ammonium nitrate which under such circumstances form exceptionally long crystals, frequently 1-inch long or more, which are extremely slow in dissolving. The presence of these solid nitrate salts in spraying equipment is extremely troublesome because of the unusual length of the salt crystals.

For these reasons liquid fertilizer solutions, such as an 8–24–0 or 8–8–8 composition containing plant food salts such as ammonium or potassium nitrate, urea, ammonium phosphate, etc., in amount close to the upper limit of their solubility at about 70° F., are frequently sprayed almost immediately after formulation while still warm to take advantage of the higher solubility of the nutrients at elevated temperature. Only when there is a fair assurance that no drop in temperature will be encountered can such compositions be stored or shipped.

Salting out of primary fertilizer salts may also result from evaporation of water from the composition although this difficulty is obviously more readily controlled than salting out which occurs as a result of cooling liquid fertilizer concentrates.

Accordingly, a general object of this invention is the provision for stabilizing in a homogeneous aqueous system solid particles which normally settle out of liquid fertilizer solutions during production, storage, shipping or use.

A more specific object of this invention is to stabilize liquid fertilizer concentrates in which plant food material salts out upon cooling.

Another object is to provide substantially saturated clear liquid fertilizer concentrates which maintain their homogeneity and stability over wider temperature ranges than liquid fertilizer concentrates consisting of simple aqueous solutions.

Yet another object is to provide liquid fertilizer concentrates which may be stored, shipped and sprayed in all weather.

A further object is the provision of an improvement in the formulation of liquid fertilizer concentrates whereby fertilizer values which normally salt out upon cooling take the form of very fine particles which remain in substantially stable homogeneous suspension therein.

Still another object is the provision of superenriched stable homogeneous flowable liquid fertilizer concentrates which contain finely divided particles of plant food material in excess of their solubility at room temperature and which remain substantially homogeneous during cooling.

Further objects and advantages will be readily apparent.

The subject invention is a result of our discovery that colloidal clay, hereafter described, may be utilized to stabilize concentrated plant aqueous plant food compositions containing solids which normally crystallize and settle out therefrom.

Stated briefly, compositions of this invention comprise water having dissolved therein at least one primary plant food material, especially highly ionic, highly soluble fertilizer salts whose solubility decreases sharply with decrease in temperature, and colloidal clay, preferably attapulgite clay, dispersed in the water in amount sufficient substantially to form in situ a stable suspension of finely divided particles which crystallize out of the system, as by cooling the system. The compositions are produced by colloidally dispersing the clay, dry or in the form of a gelled aqueous concentrate, in a liquid fertilizer solution before incipient salting takes place, whereby any salting which does occur takes place in the presence of dispersed colloidally dimensioned clay crystals. By formulating the concentrates in this manner, salts generally crystallize out as a multiplicity of uniform finely divided discrete solids rather than fewer coarser particles which would normally occur at the same cooling rate in the absence of the colloidal clay. Apparently, the dispersed colloidal clay crystals act as a seed or nucleus for the formation of a multiplicity of very fine particles of plant food material, rather than fewer coarser crystals which normally will occur. Further, the fine salted out solids that do form are stably suspended in the aqueous system simultaneously with their formation without the initial formation of a sediment. This is a result of the fact that a distinct thickening of the aqueous system results from the presence therein of dispersed colloidal clay particles.

While various clays have been recommended as suspending or thickening agents in numerous aqueous and nonaqueous systems, the use of clay to suspend in situ normally soluble salts precipitating or salting out of a fertilizer solution, in accordance with this invention, differs fundamentally in concept from such prior art uses wherein the solids to be suspended, e.g., pigments, herbicides, drilling fluid weighting agent, were by nature insoluble or at best had extremely low solubility in the vehicle. In various prior art uses of a clay suspending agent, any salting out of solids which might occur upon cooling would be minimal and the suspension of such particles would be merely incidental to the primary objective of suspending normally insoluble material.

The clay generally maintains its ability to produce stable thickened aqueous plant nutrient salt solutions at temperatures as low as the solidification point of the aqueous system. Therefore, when our clay thickened fertilizer concentrates are cooled, the systems remain homogeneous and flowable so that they may be removed from storage tanks, railway tank cars, etc., even at extremely low temperatures which would mitigate against the use of the fertilizer salt solutions in the absence of the clay. Consequently, the total nutrient content of the fertilizer salts is available at all temperatures above the freezing point of the systems without the necessity for heating and agitating the systems to redissolve plant food values. Further, our aqueous systems may be sprayed at temperatures well below their saturation temperature, and somewhat above their freezing point, without danger of clogging spray nozzles since salted out solids which form therein take the form of very finely divided particles (generally minus 100 mesh or finer), and these particles are suspended as they are formed without initial formation of an undesirable sediment. Any sediment which does occur during cooling will readily resuspend upon mildly agitating the system without the necessity for applying heat.

While compositions of this invention contain as essential ingredients water, dispersed colloidal clay, and a high concentration of at least one highly soluble primary plant food salt whose solubility curve has a sharp positive slope, the compositions may also contain other soluble plant food material, such as trace elements and secondary plant food material. Optionally, our compositions may contain finely divided (i.e., minus 100 mesh) particles of plant food material, impurities, herbicide, etc., present in excess of their solubility in the concentrated fertilizer salt solution containing colloidal clay since the clay thickened system is inherently capable of maintaining such solids in stable homogeneous suspension irrespective of the composition of such solids. Upon cooling a superenriched liquid fertilizer, the clay dispersion will suspend salted out nutrients as well as nutrients and other material normally present in the composition in finely divided solid form. In this manner, stable homogeneous fertilizer concentrates, such as, for example, a 10-10-10 balanced composition, may be formulated, thereby making feasible the production of uniform, flowable compositions considerably richer in nutrient value than compositions which are obtainable by simple solution.

More specifically, the clay we preferably use in carrying out our invention is a colloidal grade of clay containing a predominant amount of the clay mineral, attapulgite, a unique magnesium aluminosilicate. By "colloidal" clay, we refer to a clay which is capable of being dispersed in water into its ultimate colloidally dimensioned particles. This property is possessed by raw attapulgite clay, as mined, which has a volatile matter content (V.M.) of about 48%. The colloidal properties are substantially maintained until the clay is dried to a V.M. of about 10%, although optimum colloidal properties are possessed by attapulgite clay which has never been dried to a V.M. below about 18%. Thus, we prefer to employ attapulgite clay which has never been dried to a V.M. below about 18%. Raw clay may be used, although clay which has been refined to eliminate grit and coarse agglomerates may be preferred. The term "volatile matter" as used herein refers to the weight percent of a material lost when it is heated to constant weight at 1800° F. The volatile matter of attapulgite clay is predominantly water.

Unlike most clays, such as bentonite clay and kaolin clay which are composed of layered minerals, attapulgite clay is composed of ultimate colloidally dimensioned needlelike particles. Colloidal grades of attapulgite clay gel or thicken aqueous systems when dispersed therein because of the unique orientation of the colloidal attapulgite needles in the vehicle. In contrast, bentonite clays thicken water by a distinct hydration which in effect pries apart the layers of the clay mineral, causing the mineral to swell. Bentonite clays are not as useful in carrying out our invention as is attapulgite clay. Bentonite clay must be prehydrated (as by soaking from 5 to 20 parts by weight of clay in 95 to 80 parts by weight of water) to permit the dispersion of such clay in our fertilizer solutions. Therefore, the use of bentonite clay inherently dilutes such solutions. Further, generally speaking, attapulgite clay thickened solutions of plant food salts are more stable than solutions of plant food salts thickened with prehydrated bentonite clay. Sepiolite clay, which is generally similar to attapulgite clay, should be as satisfactory as attapulgite clay when it is available.

The quantity of colloidal clay we employ in putting this invention into practice is sufficient to thicken the aqueous system and will vary within the range of about ¼% to about 20%, and more usually about ½% to 5% of the total weight of the composition, expressed on a volatile free clay basis (volatile free clay weight being determined by heating the clay to constant weight at 1800° F.). When the clay is used in amount less than about ½%, the efficiency of the clay in thickening the system and suspending solids therein is decreased somewhat. Systems containing more than about 5% clay may be too thick to pour. The optimum quantity of clay to be used will depend on many variables including the nature of the solutes in the system and the efficiency of clay dispersion. Generally speaking, the quantities of clay required to obtain systems of given viscosity will vary inversely with the amount of finely divided solids to be suspended in the systems.

Attapulgite clay may be colloidally dispersed in an aqueous system containing potentially insoluble impurities when the clay is in the form of a powder; this precedure has the advantage of introducing no significant dilution water into the system. Attapulgite clay may also be incorporated as a pregelled concentrate in water or other aqueous system (e.g., phosphoric acid solution, ammonia solution, mixed fertilizer solution). As is known in the art, attapulgite clay is colloidally dispersed in aqueous systems by applying shear to the system (as contrasted with bentonite which hydrates and swells merely upon contact with water with mild mixing). Various high shear agitating equipment, such as a ball mill, colloid mill, gear pump, etc., may be used to effect colloidal dispersion of attapulgite clay.

The clay may be dispersed in an aqueous vehicle at ambient temperature or at elevated temperature. Dispersion of clay may be conducted at any point in the formulating of fertilizer composition but before material which the clay is to suspend in situ crystallizes or salts out.

As examples of concentrated aqueous plant food solutions containing nutrients in amount close to upper limit of solubility at about 70° F. which are benefited by incorporation of colloidal clay before being cooled to a temperature at which insolubles are present may be cited: an 8–24–0 solution, prepared for example, by substantially neutralizing electric furnace or crude wet process phosphoric acid with ammonia (gas or solution); an 8–8–8 solution prepared from phosphoric acid substantially neutralized with ammonia and containing urea or ammonium nitrate and muriate of potash; saturated ammonium nitrate solutions; 60% saturated urea solutions saturated potassium nitrate solutions; concentrated solutions of ammonium phosphate (mono-H and di-H): ammoniacal high nitrogen analysis solutions, such as the following: 19% ammonia, 72.5% ammonium nitrate and 8.5% water (41% N), salting out temperature 61° F.; 16.6% ammonia, 66.8% ammonium nitrate and 16.6% water (37% N) which has a salting out temperature of 48° F.; a 35% N solution analyzing 19.6% ammonia, 40.6% urea and about 39% water (salting out temperature 58° F.). Also commercial nonammoniacal high nitrogen analysis solutions such as: a 60% ammonium nitrate solution (21% N) which has a salting out temperature of 51° F.; a 20% N solution analyzing 47.5% ammonium nitrate, 20.5% sodium nitrate and 32% water which has a salting out temperature of 58° F.

Each of the compositions above mentioned is normally a clear solution at or above 70° F. and contains a high concentration of ionic, highly soluble plant food material whose solubility decreases markedly with decrease in temperature.

As mentioned, in accordance with a form of this invention, attapulgite clay is present in colloidally dispersed state in an aqueous system containing active plant food material in excess of its solubility at about 70° F. whereby upon cooling the freshly formulated system below about 70° F. insoluble fertilizer salts are formed in addition to active agricultural ingredients present originally as finely divided particles. Representative of liquid fertilizer concentrates which produce considerable quantities of salted out solids upon cooling and contain also primary fertilizer salts in excess of their solubility at room temperature may be mentioned: 9–9–9 solutions; 6–12–12 solutions; 9–27–0 solutions; a 32–0–0 solution containing 8% ammonia, 72% ammonium nitrate and 20% water (salting out temperature 85° F.); and a 70% solution of ammonium nitrate.

In carrying out the form of the invention wherein quantities of plant food salts are incorporated in excess of their solubility in the system, it may be advantageous to wet pulverize such salts simultaneously with the incorporation of clay to assure the presence of such salts in finely divided form (e.g., free from minus 100 mesh particles) thereby obviating the necessity for employing specially powdered grades of salts. Thus, for example, in producing a 10–10–10 balanced concentrate the clay may be incorporated into ammoniated phosphoric acid solution while the solution is warm as a result of heat of reaction. A supplementary neutral ammonium source, such as for example urea, and a source of $K_2O$, such as muriate of potash, may be added while clay is agitated in the ammoniated acid. Some super enriched formulations may be produced by dispersing clay in heat solubilized formation, whereby plant food material in excess of its solubility at room temperature crystallizes out in the presence of the clay.

Small amounts of tetrasodium pyrophosphate, or other clay dispersant, may be used to facilitate the dispersion of clay in water. A flocculating agent such as lime may be used to stabilize liquid fertilizer compositions containing free ammonia.

The following examples are given to illustrate more fully the practice of this invention. In these examples, parts represent parts by weight and the clay content is expressed on an "as is" clay basis, e.g., inclusive of the water content of the clay, unless otherwise indicated.

*Example I*

This example illustrates the production of a 28–0–0 fertilizer gel which may be stored at temperatures below 1° F., the normal crystallization temperature of a simple aqueous solution of the same composition. The colloidal clay used in this example was Attagel 30, a refined colloidal grade of attapulgite clay from a deposit near Attapulgus, Georgia. The V.M. of the clay, as produced, is 25%.

537 lbs. of ammonium nitrate prills (33.5% N) and 412 lbs. of urea (45% N) were slowly added to 351 lbs. of water at 115° F. while the ingredients were circulated with a gear pump having a capacity of 100 gallons per minute. The ingredients were recirculated until all salts were dissolved. 260 lbs. of Attagel 30 was added to the 1300 lbs. of high nitrogen solution to give a 20% concentration of Attagel 30, based on the solution weight (16.6% Attagel based on the total weight of gel). The system was circulated about 3 minutes. Then 50 p.s.i. back pressure was put on the pump (by partially closing the gate valve in the discharge line) to disperse the clay. After 8 minutes of running the composition had formed a stable gel capable of suspending supplemental plant food salts.

*Example II*

A saturated (65%) solution of ammonium nitrate which normally forms a hard nondispersible sediment upon cooling is thickened by sifting 3% by weight of Attagel 30 and agitating the mixture at high speed in a Waring Blendor. When the clear thickened system is slowly or rapidly cooled to about 20° F., ammonium nitrate salts out of the composition as minute crystals and the system is flowable at this temperature. Upon returning to room temperature, the composition remains homogeneous and flowable.

*Example III*

Experiments were conducted to illustrate the stabilization of a concentrated potassium nitrate solution with colloidal attapulgite clay and with Wyoming bentonite clay. A potassium nitrate solution containing the salt in excess of its solubility at room temperature was selected for the study to show the effectiveness of clay in suspending extremely large quantity of salts.

A freshly prepared 50% potassium nitrate solution (50 parts by weight to 100 parts by weight of total composition) was made up by dissolving the salt in warm water. A sample of the clear solution was placed in a pint jar, sealed and allowed to return to room temperature. The total height of the cooled sample was recorded and the height of the clear supernatant measured.

To another sample of the freshly prepared warm solution there was added 2% colloidal attapulgite clay (based on the composition weight) in the form of a pregelled aqueous concentrate obtained by shearing 10 parts by weight of the clay in 90 parts by weight of water. A portion of this material was placed in a pint jar, sealed and permitted to cool to room temperature. This procedure was repeated using Wyoming bentonite clay. The total height and height of supernatant were measured and compared with the control containing no clay, with the results tabulated in Table I.

TABLE I

| Composition | Total Height of Composition, cm. | Total Height of Supernatant, cm. |
|---|---|---|
| 50% $KNO_3$ | 9.0 | 5.0 |
| 50% $KNO_3$ plus 2% Attapulgite (10% pregel) | 7.6 | 0.2 |
| 50% $KNO_3$ plus 2% Bentonite (10% pregel) | 7.5 | 1.2 |

These data show that when colloidal attapulgite clay was dispersed in a supersaturated $KNO_3$ solution, substantially all of the composition was present as a homogeneous suspension and the quantity of supernatant was extremely small. In the absence of clay more than half of the solution took the form of a sediment. Bentonite was somewhat less effective than attapulgite clay in stabilizing the composition, as evidenced by the fact that in the bentonite thickened composition a greater separation of phases occurred.

When samples of the potassium nitrate solutions formulated with clay are cooled to 25° F. for 4 hours the system thickens somewhat as a result of salting out of the $KNO_3$ but remains substantially homogeneous and flowable. Upon return to room temperature, no sedimentation of crystallized particles is observed, indicating the effectiveness of the clay in suspending all particles which salt out throughout the cooling process. In the control sample containing no clay, the solution will substantially solidify upon being cooled to 25° F. leaving a hard caked residue composed of long salt needles on the bottom of the container. A substantial residue remains when this sample is allowed to return to room temperature.

*Example IV*

This example illustrates the usefulness of attapulgite clay in stabilizing a concentrated ammonium nitrate suspension.

When an aqueous ammonium nitrate system is prepared by dissolving 75 parts by weight of the salt in 25 parts of water at about 120° F. and the solution is permitted to cool to 70° F. in an enclosed container, long needles of the salt crystallize out and form a caked sediment on the bottom of the container. Upon cooling the system to 18° F. the system substantially solidifies.

To illustrate the production of a 75% ammonium nitrate suspension which, even at extremely low temperatures, is stable, homogeneous, flowable and free from long needles which would clog pumps and sprayers, attapulgite clay was colloidally dispersed in such a system as follows.

Ammonium nitrate crystals were added to various pregels of Attagel 30 in water to produce 75% ammonium nitrate suspensions containing 1%, 2%, 3% and 4% of Attagel 30. The crystals were added to the clay-water gels at room temperature (77° F.) in a Waring Blendor which was run at high speed until all of the ammonium nitrate crystals were ground to a fine particle size. After standing overnight there was no evidence of needles in the samples. With the exception of the sample containing only 1% Attagel 30, the formulations were flowable and homogeneous.

The 75% ammonium nitrate suspension stabilized with 3% Attagel 30 was subjected to a freeze-thaw cycle by placing a sample of the product in a closed jar in a refrigerator at 18° F. overnight. The product was examined immediately after removal from the refrigerator. No noticeable difference was observed in stability, crystal size and viscosity as compared with the sample prior to refrigeration. The sample was allowed to adjust to room temperature and re-examined. It still possessed satisfactory stability and flowability.

*Example V*

This example illustrates the use of a clay dispersant in the production of still another liquid fertilizer composition of our invention. The attapulgite clay used as the suspending agent was "Permagel," a purified colloidal grade of the clay.

A 10% aqueous dispersion of Permagel was prepared in a high shear mixer by agitating the clay in water containing tetrasodium pyrophosphate dispersant in the amount of 0.025% (0.25% based on the weight of the Permagel). 5.8 parts by weight of anhydrous ammonia (80% N) was bubbled into 25.0 parts of the 10% Permagel concentrate to supply 4.7 parts of nitrogen. 0.2 parts by weight of lime was then added to flocculate the ammoniated dispersion. 25.8 parts by weight of a wet process grade phosphoric acid (54.4% $P_2O_5$) was mixed in to supply 14 parts of $P_2O_5$. 20.6 parts of urea (46.7% N) was mixed in to supply 9.3 parts of nitrogen and 14 parts of $K_2O$ were supplied by incorporating 22.6 parts of powdered potassium chloride (63.1% $K_2O$).

A moderately heavy, pourable gel resulted which showed excellent stability at a temperature as low as 10° F. When the gel returned to room temperature, no sedimentation of insoluble or crystallized particles was observed.

We claim:

1. A highly concentrated homogeneous stable and flowable aqueous plant food composition comprising water, at least one primary plant nutrient crystalline material selected from the group consisting of urea, ammonium nitrate, ammonium phosphate and potassium nitrate in amount in excess of its solubility in said water whereby finely divided crystalline particles of said primary plant food material are present in said water and colloidal attapulgite clay dispersed in said water, said clay being present in amount of at least ¼% of the weight of said composition, on a volatile free clay weight basis, and in amount sufficient to form a stable suspension of said finely divided particles without thickening said composition to an extent such that it is not pourable, said finely divided particles having crystallized in situ in the water in the presence of said colloidally dispersed clay.

2. The composition of claim 1 in which the amount of said clay does not exceed 20% of the weight of said composition, expressed on a volatile free clay weight basis.

3. A highly concentrated homogeneous stable and flowable aqueous plant food composition having an available nitrogen content of at least 30% and comprising water, ammonia, at least one crystalline plant nutrient material selected from the group consisting of urea, ammonium nitrate, ammonium phosphate and potassium nitrate, said plant nutrient material being present in amount in excess of its solubility in said composition whereby finely divided crystalline particles of said plant nutrient material are present, and colloidal attapulgite clay dispersed in said water, said clay being present in amount of at least ¼% of the weight of said composition, on a volatile free clay weight basis, and in amount sufficient substantially to form a stable suspension of said finely divided particles without thickening said composition to an extent such that it is not pourable, said finely divided particles having crystallized in situ in the presence of said colloidally dispersed clay.

4. The composition of claim 3 in which the amount of said clay does not exceed 20% of the weight of said composition, expressed on a volatile free clay weight basis.

5. A highly concentrated homogeneous stable and flowable aqueous plant food composition comprising water, a crystalline water-soluble primary plant nutrient material, said primary plant nutrient material being present in amount corresponding substantially to its solubility in said water, and colloidal attapulgite clay dispersed in said water in amount of at least ¼% of the weight of said composition, on a volatile free clay weight basis, and in amount sufficient substantially to form in situ a stable suspension of any finely divided particles of said plant nutrient material which crystallize out of the water upon cooling, said amount of clay being insufficient to form an unpourable composition.

6. The composition of claim 5 in which said crystalline plant nutrient material is further characterized by the fact that its water solubility decreases substantially with decrease in temperature, whereby upon cooling said water, a substantial portion of the plant nutrient material crystallizes out.

7. The composition of claim 5 in which the amount of said clay does not exceed 20% of the weight of said composition, expressed on a volatile free clay weight basis.

8. A highly concentrated homogeneous stable and flowable aqueous plant nutrient composition comprising water, at least one water-soluble crystalline primary plant nutrient material whose water solubility decreases substantially with decrease in temperature and is selected from the group consisting of ammonium phosphite, ammonium nitrate, urea and potassium nitrate in amount corresponding substantially to its solubility in said water, and attapulgite clay dispersed in said water in amount of at least ¼% of the weight of said composition, on a volatile free clay weight basis, and in amount sufficient substantially to form a stable suspension of finely divided particles of said plant food material which crystallize out of said solution upon cooling, said amount of clay being insufficient to form an unpourable composition.

References Cited by the Examiner

UNITED STATES PATENTS

| 1,228,361 | 5/1917 | Hayden | 71—64 |
| 2,324,079 | 7/1943 | Greger | 106—108.5 |
| 2,773,757 | 12/1956 | Connell et al. | 71—22 |
| 2,869,998 | 1/1959 | Vierling | 71—1 X |
| 2,875,120 | 2/1959 | Trademan et al. | 167—42 |
| 2,971,292 | 2/1961 | Malecki | 71—1 |
| 2,991,170 | 7/1961 | Szepesi et al. | 71—64 |
| 3,041,159 | 6/1962 | Smith | 71—64 |
| 3,062,637 | 11/1962 | Marples et al. | 71—64 |
| 3,096,170 | 7/1963 | Newsom | 71—64 |

OTHER REFERENCES

Chemical and Engineering News, vol. 37, No. 39, Sept. 28, 1959, page 70.

McCarter et al., The Thermal Activation of Attapulgus Clay, Ind. and Eng. Chem., vol. 42, No. 3, 1950, pp. 529–533.

DONALL H. SYLVESTER, *Primary Examiner.*

GEORGE D. MITCHELL, ANTHONY SCIAMANNA,
*Examiners.*